(12) United States Patent
Andersen

(10) Patent No.: US 6,496,638 B1
(45) Date of Patent: Dec. 17, 2002

(54) OPTICAL FIBER CASSETTE

(75) Inventor: Jesper Alexander Andersen, Verona, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/177,637

(22) Filed: Oct. 23, 1998

(51) Int. Cl.[7] .................................................. G02B 6/36
(52) U.S. Cl. ...................................................... 385/135
(58) Field of Search ................................ 385/135, 134, 385/136, 137

(56) References Cited

U.S. PATENT DOCUMENTS

| 4,709,980 A | * 12/1987 | Coll et al. ................. 350/96.2 |
| 4,805,979 A | * 2/1989 | Bossard et al. ............ 350/96.2 |
| 5,530,786 A | * 6/1996 | Radliff et al. ............... 385/136 |
| 5,566,269 A | * 10/1996 | Eberle, Jr. et al. .......... 385/137 |
| 5,590,234 A | * 12/1996 | Pulido ......................... 385/135 |
| 5,790,741 A | * 8/1998 | Vincent et al. ............. 385/135 |
| 5,995,700 A | * 11/1999 | Burek et al. ................ 385/135 |
| 6,081,644 A | * 6/2000 | Stateczny et al. .......... 385/135 |
| 6,144,792 A | * 11/2000 | Kim et al. .................. 385/135 |

* cited by examiner

Primary Examiner—Frank G. Font
Assistant Examiner—Michael P. Mooney
(74) Attorney, Agent, or Firm—Harness, Dickey & Pierce, P.L.C.

(57) ABSTRACT

A cassette stores varying lengths of excess optical fiber defined during the installation of optical fiber cable. The cassette has two spools and numerous pathways for winding and storing excess optical fiber, while maintaining the minimum bend radius. Retainers hold the optical fiber in the pathways and on the spools. Two splice receptacles releasably retain splice connections. A tension wire tie-down is provided, having a variety of options for placement and direction, to clamp the optical fiber cable, and electrically ground the tension wires. Tabs are provided for releasably locking the hinged cover in the open and closed positions.

19 Claims, 5 Drawing Sheets

OPTICAL FIBER CASSETTE

FIELD OF THE INVENTION

This invention relates to the field of fiber optics, and more particularly to a cassette for storing varying lengths of excess optical fiber during the installation of optical fiber cable.

BACKGROUND OF THE INVENTION

There are many applications that utilize an optical fiber network to establish optical communications between a host digital terminal (HDT) at a central office and an optical network unit (ONU) at a remote location. Typically, each ONU installation will have a unique optical fiber cable routing. Each strand of optical fiber cable follows a different path between the HDT and the ONU, and will have an excess length of optical fiber that must be stored.

The optical fiber cable consists of the optical fiber and two electrically conducting tension wires. The optical fiber itself is extremely fine, on the order of 0.25 mm (0.0098 inches) in diameter. In order that the optical fiber not become kinked, which will degrade the quality of light pulses traveling through it, the optical fiber must not be bent sharply anywhere along its path. The two tension wires accompanying the optical fiber are referred to as tension lines, as they provide mechanical resistance to stretching when the optical fiber cable is under tension. Since optical fiber cable, and in turn the tension lines, may be subject to lightening strikes, the tension lines must be grounded at tie-down points.

The joining together of two fibers end-to-end to carry a signal of light pulses is called a splice connection. The splice connection must be held in place securely.

As cutting optical fibers is a delicate process, special tools and small jigs are used to perform the whole cleaving operation. For most applications, the ends are cut close to perpendicular to the optical fiber axis. Cleanly cleaved optical fiber ends are needed for low loss fusion splices. For high-performance optical connectors and mechanical splices, the cut tip of the fiber is ground and polished. Cables that are field installed are often terminated before installation to approximately the length needed, resulting in an excess length of optical fiber that must be stored.

SUMMARY OF THE INVENTION

In accordance with the present invention, there is provided an optical fiber cassette, for use in connection with an optical domain network to store excess optical fiber cable. The optical fiber cable includes an optical fiber and a tension wire. The optical fiber cassette comprises a chassis having at least one spool for winding and storing excess optical fiber, the spool having a wall with a radius of at least a minimum bend radius.

A method is also disclosed.

DETAILED DESCRIPTION OF THE FIGURES

A more complete understanding of the present invention may be obtained from consideration of the following description in conjunction with the drawing, in which.

DESCRIPTION OF VARIOUS ILLUSTRATIVE EMBODIMENTS

Figure 1:
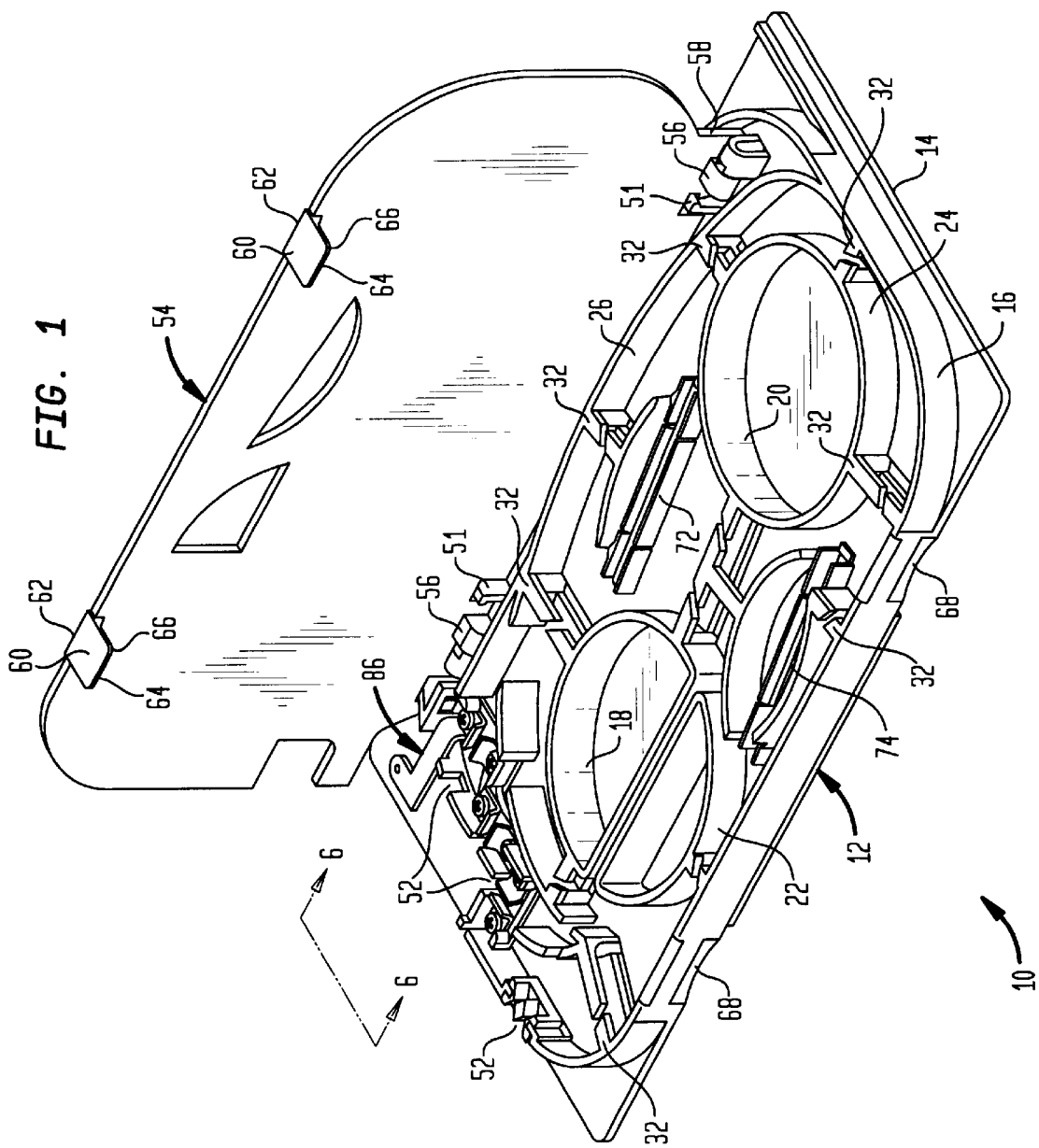
FIG. 1 is a perspective view of an optical fiber cassette constructed in accordance with the invention.
Figure 2:
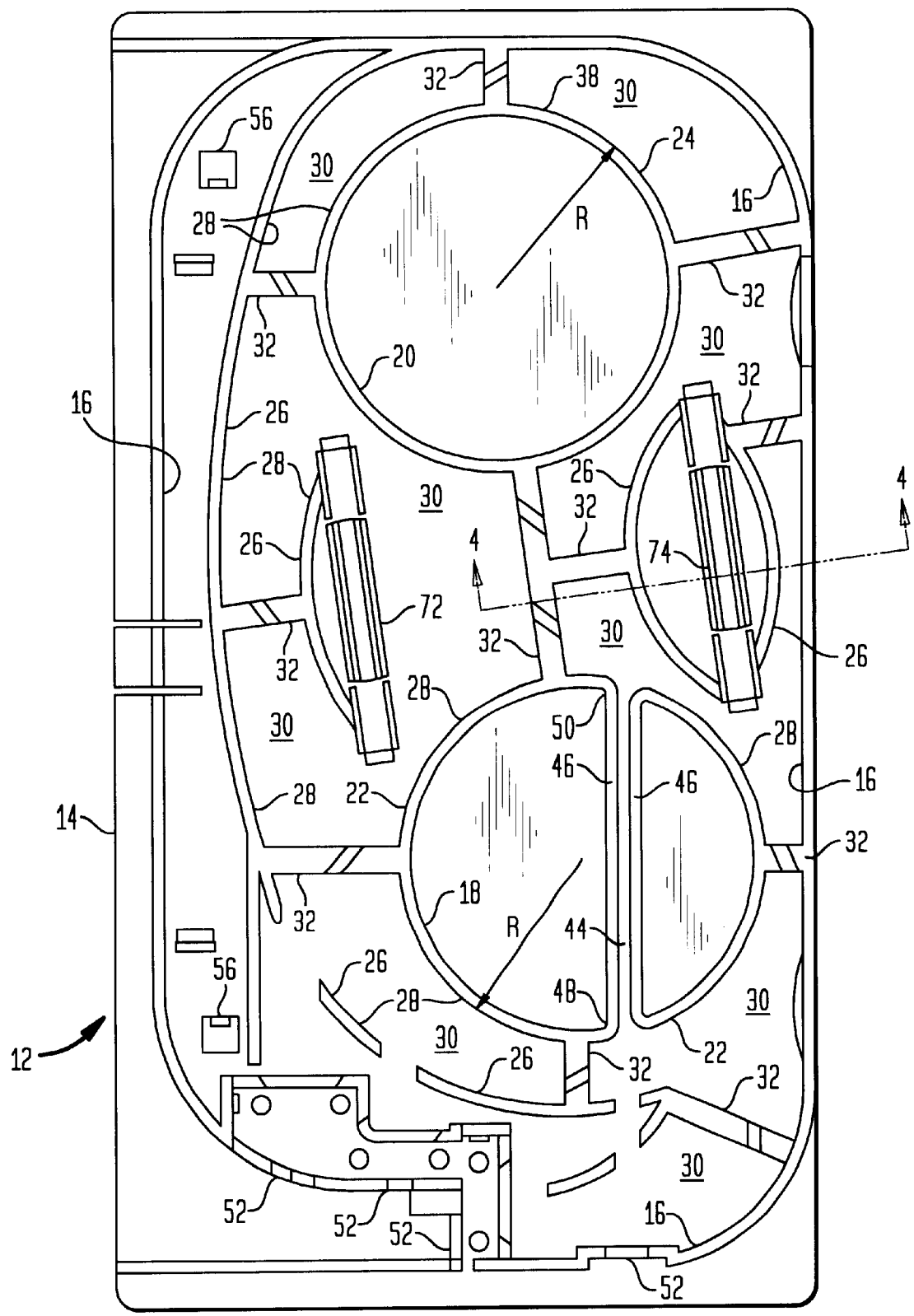
FIG. 2 is a top view of the chassis of the optical fiber cassette of FIG. 1.

Referring now to the drawings, and especially to FIGS. 1 and 2, an optical fiber cassette is shown at 10, and comprises a chassis 12 having a generally planar base portion 14. A rim wall 16 generally encircles the base portion 14. The chassis 12 has integral first 18 and second 20 spools for winding and storing excess optical fiber. The first 18 and second 20 spools each have a wall 22 and 24 respectively, with a radius R of at least a minimum bend radius.

The chassis 12 includes a. plurality of path wall segments 26. The path wall segments 26, rim wall 16, and spool walls 22 and 24 define pathway walls 28 of pathways 30 aligned generally tangentially to the spool walls 22 and 24. The pathways 30 receive and store the optical fiber and guide the optical fiber toward the spools 18 and 20. The path wall segments 26 each have a radius of at least the minimum bend radius.

The minimum bend radius is the radius below which an optical fiber should not be bent. It will vary with different cable designs. Bending the cable tighter than the minimum bend radius may result in increased attenuation and broken fibers. The manufacturer should specify the minimum radius to which the cable may safely be bent during installation, and for the long term. The former is somewhat shorter than the latter. The minimum bend radius is in general also a function of tensile stresses, e.g., during installation, while being bent around a sheave while the fiber or cable is under tension. If no minimum bend radius is specified, one is usually safe in assuming a minimum long-term low-stress radius not less than 15 times the cable diameter. In practice, optical fiber bends are gradual relative to the diameter of the fiber, with curvature of a few centimeters or more compared to a 100 $\mu$m diameter of a typical optical fiber core. The minimum bend radius is typically about 30 mm (1.1 inches). Larger core optical fibers are more rigid and have a larger minimum bend radius.

Figure 3A:
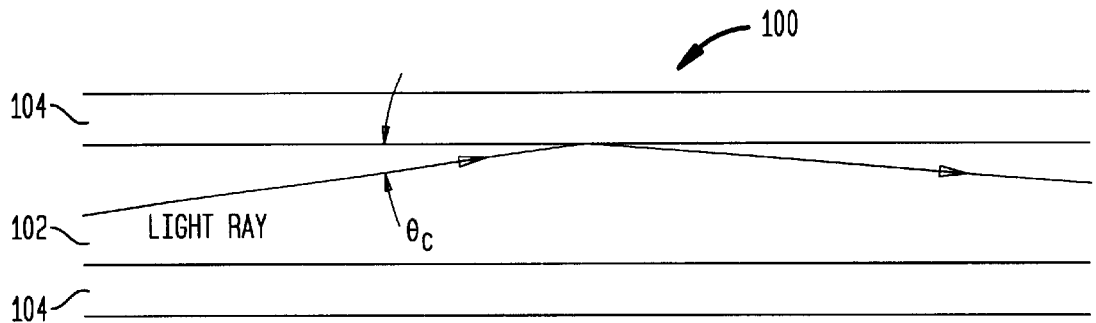
FIG. 3a is a simple ray model of transmission for a straight optical fiber.
Figure 3B:
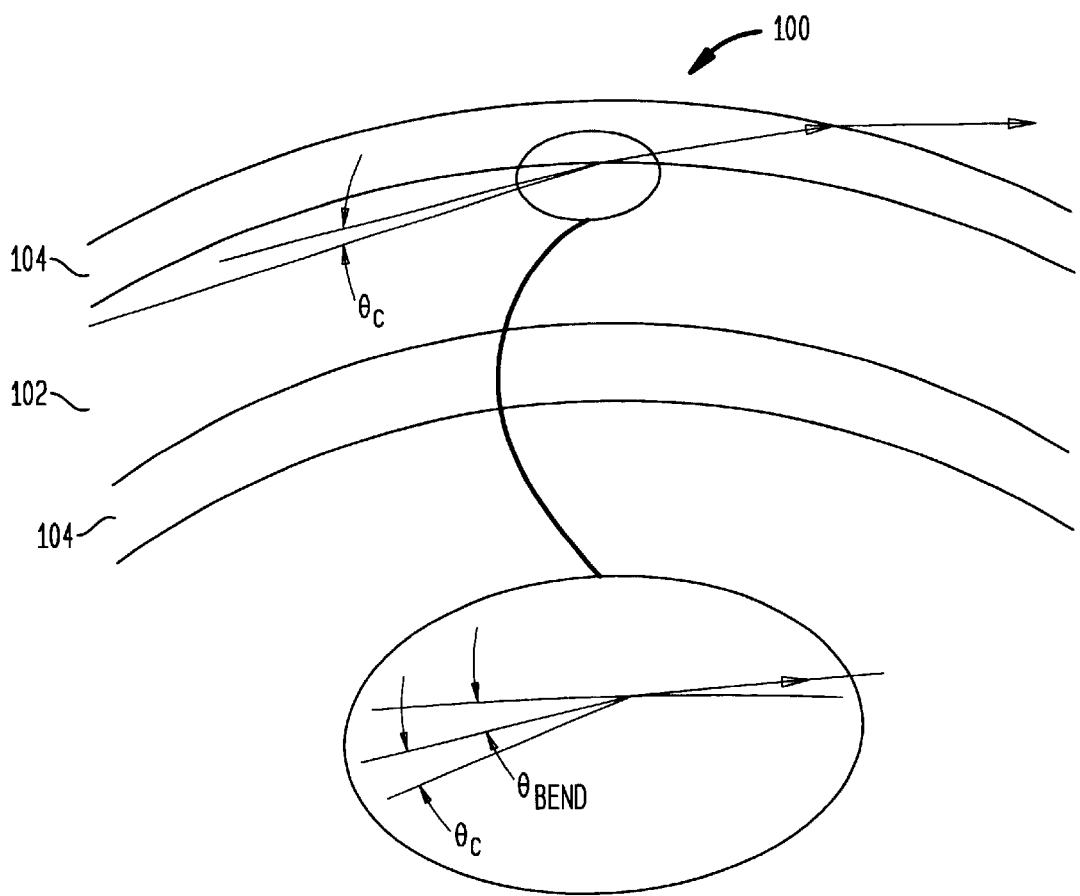
FIG. 3b is a simple ray model of transmission for a bent optical fiber.

Referring to FIG. 3a there is shown a simple ray model of transmission for a straight optical fiber. FIG. 3b shows a simple ray model of transmission for a bent optical fiber. The optical fiber 100 shown in longitudinal cross section has an optical core 102 which is surrounded by a cladding 104 and has a critical angle $\theta_c$. When high order mode light rays strike a bend in the optical fiber, light can leak out if it hits the side of the fiber at an angle beyond the critical angle $\theta_c$. This increases the loss in the optical fiber. While lower order modes are not likely to leak out, they can become transformed into higher order modes and thus leak out at the next bend. The bending of the optical cable 100 as illustrated in FIG. 3b, causes a light ray to strike the core 102 cladding 104 boundary at an angle greater than the critical angle $\theta_c$, and a portion of the light ray will leak out. The extra, or increased angle caused by bending of the optical fiber 100 is indicated by the angle $\theta_{bend}$ in the inset of FIG. 3b. Accordingly, it is critical that the excess optical fiber be stored in a fashion in which any bend has a radius of at least the minimum bend radius.

Figure 4:
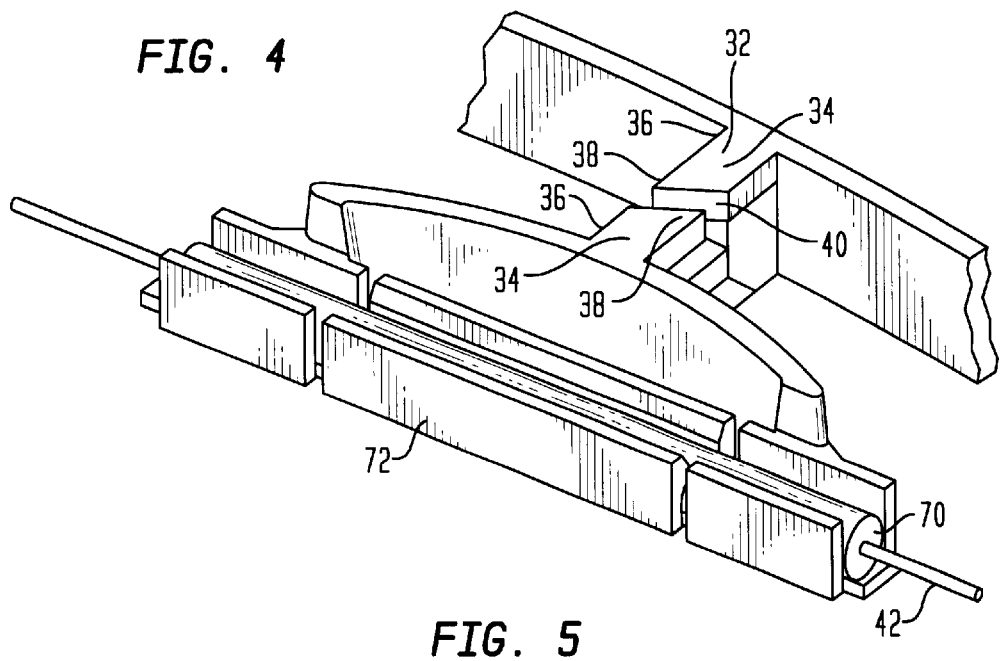
FIG. 4 is a perspective view of a splice connector receptacle of the optical fiber cassette of FIG. 1.
Figure 5:
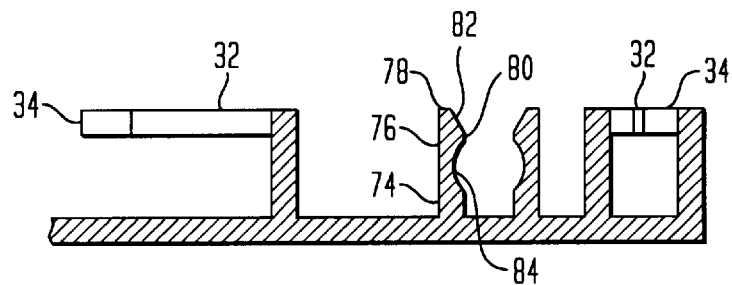
FIG. 5 is a cross-sectional elevational view of a splice connector receptacle and pathways, taken along lines 4—4 of FIG. 2.

Turning now to FIGS. 4 and 5, as well as FIGS. 1 and 2, a plurality of retainers 32 are disposed transversely over the pathways 30. The retainers 32 releasably retain the optical fiber in the pathways 30 and on the spools 18 and 20. The retainers 32 each have two bars 34 extending from proximal ends 36 at opposite pathway walls to distal ends 38. The distal ends 38 of the bars 34 define a slot 40 between the bars 34 at an angle to the direction of the pathway 30. Thus, upon installing the optical fiber 42 in the cassette 10, the optical fiber 42 will be turned to the angle of the slot 40 and pass through the slot 40. The optical fiber 42 will then be turned to lie in the direction of the pathway 30 and will not pass back through the slot 40, thereby being retained in the pathway 30.

The first spool 18 includes a tunnel pathway 44 defined by a pair of generally parallel tunnel walls 46 extending from a first point 48 on the spool wall 22 through the spool 18 to a second point 50 on the spool wall opposite the first point, so as to allow the optical fiber to pass through the first spool 18.

Figure 7:
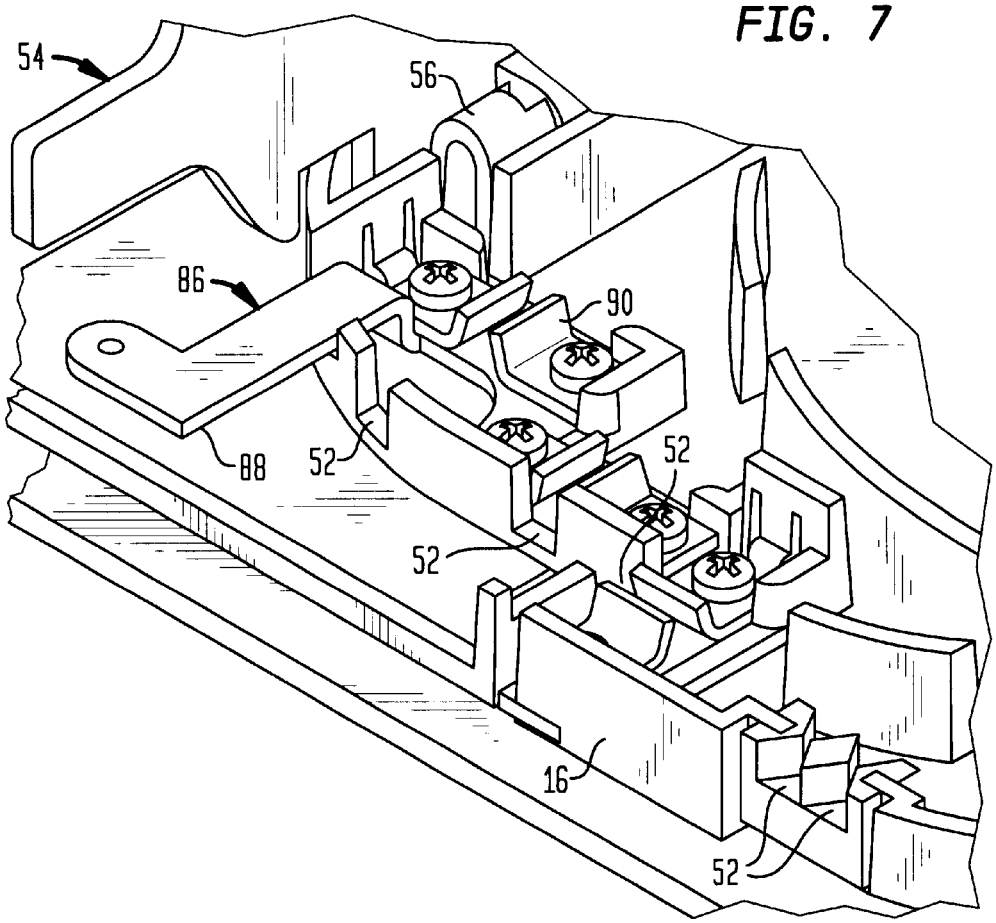
FIG. 7 is a perspective view of a tension wire tie-down mounted in the chassis, taken along lines 6—6 of FIG. 1.

Referring now to FIG. 7, as well as FIGS. 1 and 2, a plurality of portals 52, are aligned with the pathways 30. The optical fiber cable will enter and exit the cassette 10 through the portals 52, so as to provide a variety of options for placement and direction of the optical fiber cables.

Figure 6:
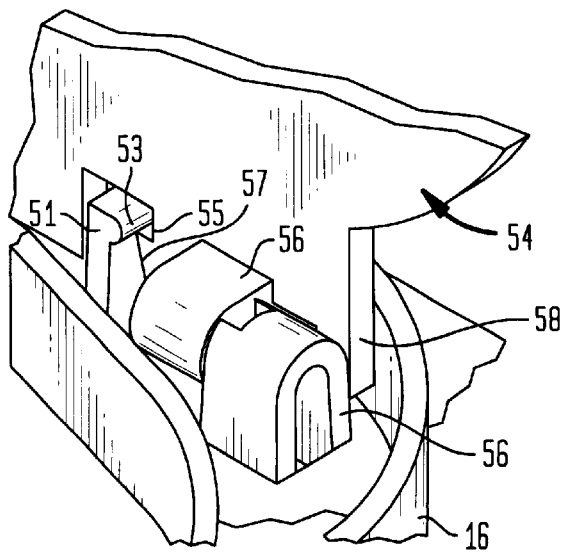
FIG. 6 is a perspective view of a hinge and locking tab of the optical fiber cassette of FIG. 1.

Referring now to FIGS. 1 and 6, a cover 54 is assembled to the chassis 12 by snapping a pair of keys 51 into slots 55 in the cover 54. The keys 51 each have a barb 53 on the distal end that rides up a ramp 57 and enters the slot 55. The cover 54 is attached to the chassis 12 by pivotal means, typically a hinge or a pair of hinges 56. The cover 54 is movable from an open position wherein the optical fiber cable will be placed for storage in the cassette 10, to a closed position wherein the optical fiber cable will be protected from damage. A first locking means is provided for releasably locking the cover 54 in the open position. The first locking means preferably will include a tab 58 projecting from the cover 54. The tab 58 is closely juxtaposed between the hinges 56 and the rim wall 16 when the cover 54 is in the open position. A second locking means is provided for releasably locking the cover 54 in the closed position. The second locking means preferably will include a finger 60 having a proximal end 62 attached to the cover 54. The finger 60 has a distal end 64 projecting downward from the cover 54, and a barb 66 at the distal end 64. The barb 66 engages a notch 68 in the chassis 12 when the cover 54 is in the closed position.

Turning now to FIGS. 4 and 5, as well as FIGS. 1 and 2, the chassis 12 has at least one first splice receptacle 72, and preferably a second splice receptacle 74 to releasably retain a splice connection 70. The first 72 and second 74 splice receptacles each has a pair of generally parallel, opposite splice receptacle walls 76. Each wall 76 has a top edge 78 and an inside surface 80 facing the opposite wall. The inside surfaces 80 each have a bevel 82 adjacent the top edge 78 and a groove 84 below the bevel 82. Accordingly, as the splice connection 70 is inserted into the splice receptacle 72, the bevels 82 will cause the walls 76 to move outward resiliently, the splice connection 70 will pass the bevels 82 and enter the grooves 84, and the walls 76 will move inward with bias, thereby clamping the splice connection 70 releasably in the grooves 84.

Figure 8:
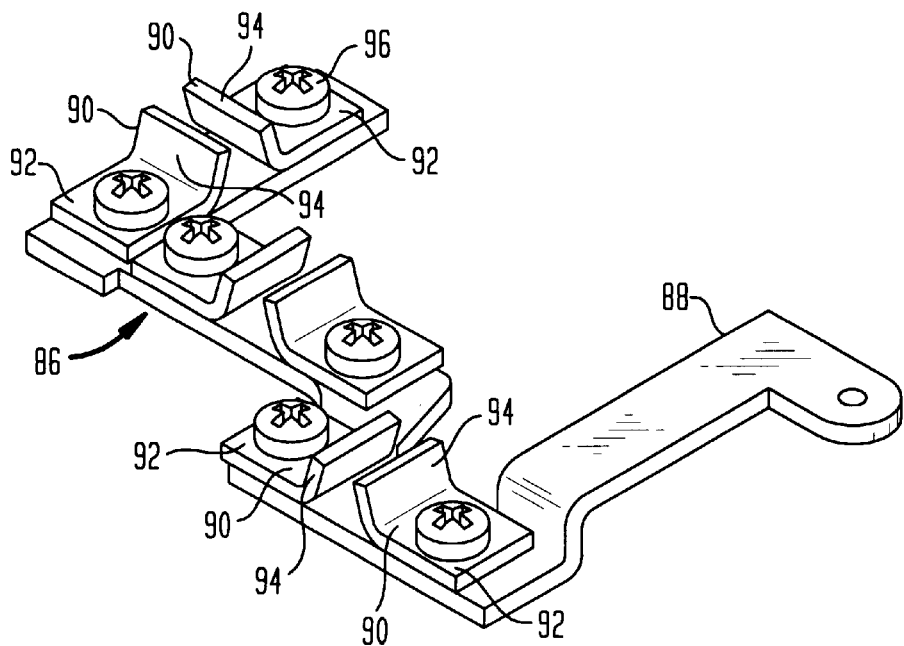
FIG. 8 is a perspective view of the tension wire tie-down.

Referring now to FIGS. 7 and 8, as well as FIG. 1, a tension wire tie-down 86 is provided to clamp the optical fiber cable and electrically ground the tension wire (not shown). The tension wire tie-down comprises a base member 88 attached to the chassis, the base member 88 being electrically conductive. A plurality of clamps 90 are provided. Each clamp 90 has a bottom plate 92 and a flange 94 projecting upward from the bottom plate 92 at an obtuse angle thereto. The clamps 90 are electrically conductive, and are attached with screws 96 to the base member 88. The clamps 90 are disposed in pairs with the flanges 94 opposite each other. Each pair is adjacent a portal 52, so that the optical fiber cable will pass through the portal 52 and between the opposing flanges 94 of a pair of clamps 90. The flanges 94 will engage and hold down the optical fiber cable and make electrical contact with the tension wire, thereby grounding the tension wire to the base member 88.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which will come within the scope of the appended claims is reserved.

What is claimed is:

1. An optical fiber cassette for use in connection with an optical domain network to store excess optical fiber cable, the optical fiber cable including an optical fiber and a tension wire, the optical fiber cassette comprising:

a chassis having at least one spool for winding and storing excess optical fiber, the spool having a wall with a radius of at least a minimum bend radius, said chassis including at least one single, stand alone, channel splice receptacle to releasably retain a splice connection, said splice receptacle aligned tangentially to said at least one spool to retain a single optical splice in a fiber extending from said at least one spool to be positioned so as to only be tangentially oriented to said at least one spool, a cover attached to the chassis, the cover being movable from an open position wherein the optical fiber cable will be placed for storage in the chassis, to a closed position wherein the optical fiber cable will be protected from damage.

2. The optical fiber cassette as recited in claim 1 wherein the chassis further comprises a tension tie-down to clamp the optical fiber cable and electrically ground the tension wire.

3. The optical fiber cassette as recited in claim 1 wherein the chassis further comprises:

a plurality of pathways aligned generally tangentially to the spool wall for receiving and storing the optical fiber and guiding the optical fiber toward the spool, the pathways having a radius of at least the minimum bend radius;

a plurality of retainers disposed within the pathways for releasably retaining the optical fiber in the pathways and on the spool; and at least one portal through which the optical fiber cable will enter the cassette.

4. The optical fiber cassette as recited in claim 1 wherein the splice receptacle further comprises a pair of generally parallel receptacle walls, each wall having a top edge and an inside surface facing the opposite wall, the inside surfaces each having a bevel adjacent the top edge, at least one of the walls having a groove below the bevel so that as the splice connector is inserted into the splice receptacle, the bevels will cause the walls to move outwardly resiliently, the splice connector will pass the bevels and enter the groove, and the walls will move inward with bias, thereby clamping the splice connector releasable in the groove.

5. The optical fiber cassette as recited in claim 2, wherein the tension wire tie-down further comprises:
   a clamp having a bottom plate and a flange projecting upward from the bottom plate at an obtuse angle thereto so as to engage and hold down the optical fiber cable; and
   a releasable fastener to secure the clamp.

6. The optical fiber cassette as recited in claim 1 wherein the cover further comprises:
   pivotal means for pivotal attachment to the chassis;
   first locking means for releasably locking the cover in the open position; and
   second locking means for releasably locking the cover in the closed position.

7. An optical fiber cassette for use in connection with storage of excess optical fiber at a cable termination plant, the optic fiber cable including an optical fiber and at least one tension wire, the optical fiber cassette comprising:
   a chassis having a generally planar base portion and a rim wall generally encircling the base portion, the chassis having integral first and second spools for winding and storing excess optical fiber, the spools each having a wall with a radius of at least a minimum bend radius, the chassis having at least one single, stand alone, channel splice receptacle to releasably retain a splice connection, said at least one splice receptacle aligned tangentially to said first and said second spools to retain a single optical splice in a fiber extending between said first and second spools to be positioned so as to only be tangentially oriented to both said first and second spools;
   a cover attached to the chassis, the cover begin movable from an open position wherein the optical fiber cable will be placed for storage in the cassette, to a closed position wherein the optical fiber cable will be protected from damage; and
   a tension wire tie-down to clamp the optical fiber cable and electrically ground the tension wire.

8. The optical fiber cassette as recited in claim 7, wherein the chassis further comprises:
   a plurality of path wall segments, the path wall segments, rim wall, and spool walls defining pathway walls of pathways aligned generally tangentially to the spool walls, for receiving and storing the optical fiber and guiding the optical fiber toward the spools, the path wall segments each having a radius of at least the minimum bend radius;
   a plurality of retainers disposed transversely over the pathways for releasably retaining the optical fiber in the pathways and on the spool, the retainers each having two bars extending from proximal ends at opposite pathway walls to distal ends, the distal ends of the bars defining a slot between the bars at an angle to the direction of the pathway, so that upon installing the optical fiber in the cassette, the optical fiber will be turned to the angle of the slot and pass through the slot, the optical fiber will then be turned to lie in the direction of the pathway and will not pass back through the slot, thereby being retained in the pathway; and
   a plurality of portals, aligned with the pathways, through which the optical fiber cable will enter and exit the cassette, so as to provide a variety of options for placement and direction of the optical fiber cables.

9. The optical fiber cassette as recited in claim 7, wherein the splice receptacle further comprises a pair of generally parallel, opposite splice receptacle walls, each wall having a top edge and an inside surface facing the opposite wall, the inside surfaces each having a bevel adjacent the top edge and a groove below the bevel, so that as the splice connector is inserted into the splice receptacle, the bevels will cause the walls to move outward resiliently, the splice connector will pass the bevels and enter the grooves, and the walls will move inward with bias, thereby clamping the splice connector releasably in the grooves.

10. The optical fiber cassette as recited in claim 7, wherein the tension wire tie-down further comprises:
    a base member attached to the chassis, the base member being electrically conductive; and
    a plurality of clamps, each clamp having a bottom plate and a flange projecting upward from the bottom plate at an obtuse angle thereto, the clamps being electrically conductive, the clamps being attached with screws to the base member, the clamps being disposed in pairs with the flanges opposite each other, each pair being adjacent a portal, so that the optical fiber cable will pass through the portal and between the opposing flanges of a pair of clamps, and the flanges will engage and hold down the optical fiber cable and make electrical contact with the tension wire, thereby grounding the tension wire to the base member.

11. The optical fiber cassette as recited in claim 7, wherein the first spool includes a tunnel pathway defined by a pair of generally parallel tunnel walls extending from a first point on the spool wall through the spool to a second point on the spool wall opposite the first point, so as to allow the optical fiber to pass through the first spool.

12. The optical fiber cassette as recited in claim 7, wherein the cover further comprises:
    pivotal means for pivotal attachment to the chassis;
    first locking means for releasably locking the cover in the open position; and
    second locking means for releasably locking the cover in the closed position.

13. The optical fiber cassette as recited in claim 12, wherein:
    the pivotal means includes a hinge;
    the first locking means includes a tab projecting from the cover, the tab being closely juxtaposed between the hinge and the rim wall when the cover is in the open position; and
    the second locking means includes a finger having a proximal end attached to the cover and a distal end projecting downward from the cover, the finger having a barb at the distal end, the barb engaging a notch in the chassis when the cover is in the closed position.

14. A method for storing excess optical fiber cable for use in connection with an optical network unit, the optical fiber cable including an optical fiber and an electrical tension wire, the method comprising the steps of:
    mounting a first spool on a chassis, the spool having a radius of at least a minimum bend radius, mounting a single, stand alone, channel splice receptacle on the chassis located so as to retain a single optical splice in a fiber extending from said first spool to be positioned so as to only be tangentially oriented to said first spool;

retaining a splice connection releasable in the splice receptacle;

receiving and storing the optical fiber on pathways having a radius of at least the minimum bend radius;

aligning the pathways generally tangentially to the first spool;

mounting a plurality of retainers transversely over the pathways;

guiding the optical fiber in the pathways toward the first spool;

winding and storing excess optical fiber on the first spool;

retaining the optical fiber releasably in the pathways and on the spool;

guiding the optical fiber in the pathways toward a tension wire tie-down;

clamping the optical fiber cable in the tension wire tie-down;

grounding the tension wire electrically to the tension wire tie-down; and attaching a cover to the chassis, defining a cassette.

15. The method as recited in claim 14, comprising the steps of:

providing splice receptacle walls and forming grooves in the splice receptacle walls; and biasing the splice receptacle walls inward, clamping the splice connector releasably in the grooves.

16. The method as recited in claim 14, further comprising the steps of:

attaching a tension wire tie-down base member to the chassis;

attaching a plurality of clamps with screws to the base member;

projecting a flange upward from each clamp at an obtuse angle thereto;

arranging the clamps in pairs with the flanges opposite each other;

engaging and holding down the optical fiber cable with the flanges; and conducting electricity through the tension wire, the clamps, and the base member, thereby grounding the tension wire to the base member.

17. The method as recited in claim 14, further comprising the steps of:

pivoting the cover on a hinge to an open position;

locking the cover releasably in the open position;

installing the optical fiber cable in the cassette;

pivoting the cover on the hinge to a closed position; and locking the cover releasably in the closed position.

18. The method as recited in claim 14, further comprising the steps of:

mounting a second spool on the chassis, the spool having a radius of at least a minimum bend radius;

aligning the pathways generally tangentially to the second spool;

guiding the optical fiber in the pathways toward the second spool;

winding and storing excess optical fiber on the second spool; and retaining the optical fiber releasably on the second spool.

19. The method as recited in claim 18, further comprising the steps of:

providing a tunnel pathway through the first spool; and guiding the optical fiber in the tunnel pathway through the first spool.

* * * * *